Oct. 25, 1932. A. J. MICHELIN Re. 18,638
TIRE FOR RAILWAY VEHICLES
Original Filed Nov. 10, 1930
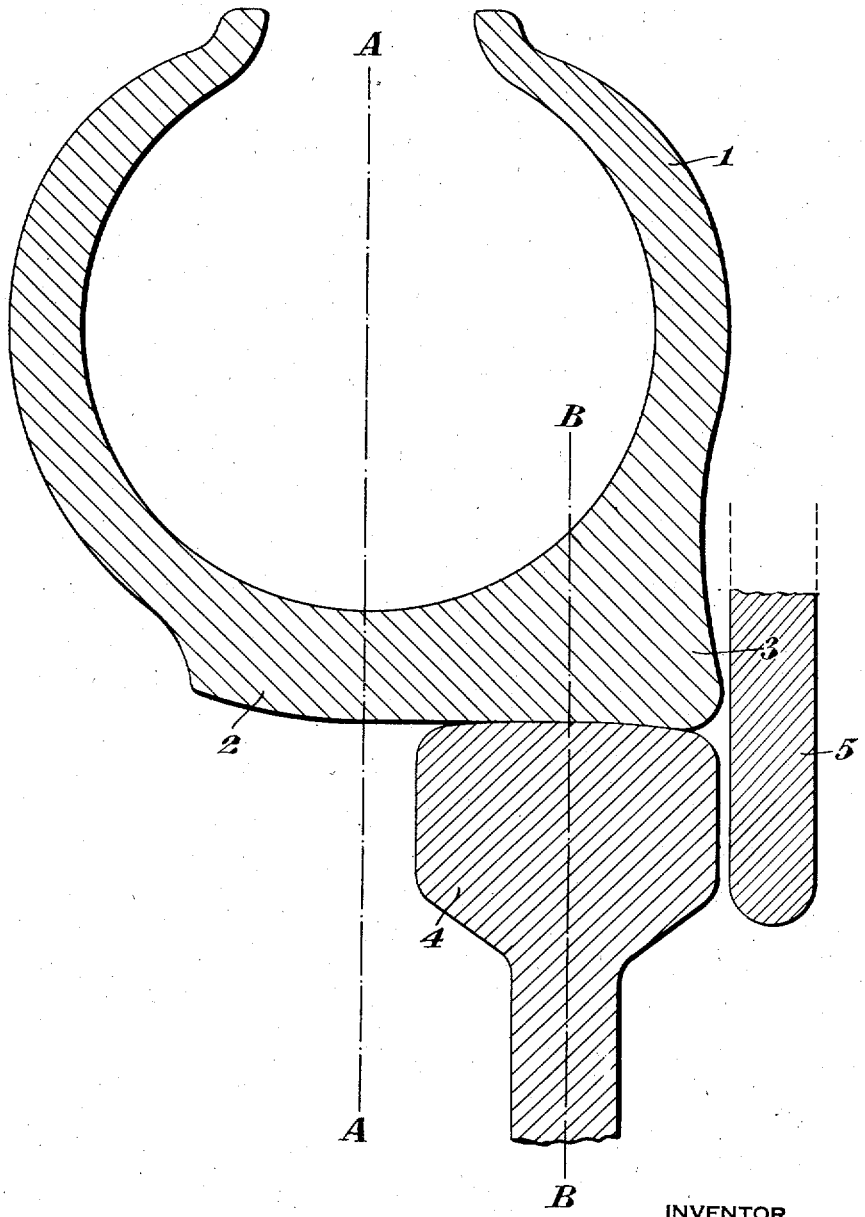
INVENTOR
MARCEL JOSEPH JULES MICHELIN
EXECUTOR OF THE ESTATE OF
ANDRÉ JULES MICHELIN, DECEASED,
BY Hand Crosby & Neal
ATTORNEYS Reissued Oct. 25, 1932 Re. 18,638

UNITED STATES PATENT OFFICE

ANDRÉ JULES MICHELIN, DECEASED, LATE OF PARIS, FRANCE, BY MARCEL JOSEPH JULES MICHELIN, EXECUTOR, OF CLERMONT-FERRAND, FRANCE, ASSIGNOR TO MICHELIN ET CIE., OF CLERMONT-FERRAND, FRANCE, A CORPORATION OF FRANCE

TIRE FOR RAILWAY VEHICLES

Original No. 1,833,718, dated November 24, 1931, Serial No. 494,768, filed November 10, 1930, and in France November 21, 1929. Application for reissue filed May 12, 1932. Serial No. 610,968.

The invention has for its object an improvement in the cover treads of pneumatic tires adapted for use in connection with railway vehicles. This improvement has for its result to provide a larger tread surface and to permit of the tire being capable of adapting itself to variations in the distance between rails, for instance in curves.

To this effect, according to the present invention, the pneumatic tire comprises a dissymmetric tread, the horizontal surface thereof extending more on one side than on the other.

A preferred embodiment of the invention will be described with reference to the appended drawing, given merely by way of example and which shows a vertical section of a pneumatic tire cover according to the invention.

The tread 2 of the cover 1 of the pneumatic tire is laterally extended, as shown at 3, on the side that bears on rail 4. The axis of the pneumatic tire is shown in A—A, and the axis of the rail in B—B.

It will be readily understood that even under the most unfavourable circumstances, for instance in curves, when the flange of one of the wheels comes in contact with the rail on one side while the flange of the opposed wheel is about one and a half inch distant from the other rail, a maximum tread surface is always obtained, owing to the dissymmetric disposition of the tread.

A flange 5 of the character above described is indicated diagrammatically on the drawing.

While the above description endeavors to disclose what is believed to be an efficient and simple embodiment of the invention, it is to be understood that the invention is not limited by the specific details as shown, but that the tread surface could be increased on one side in any other suitable manner without departing from the spirit of the invention as comprehended within the scope of the appended claims.

What is claimed is:

1. In covers of pneumatic tires adapted to be fitted on railway vehicles, a cylindrical lateral extension of the tread on one side only, giving the cover a dissymmetric shape, whereby an increased tread surface of the tire is obtained.

2. In covers of pneumatic tires adapted to be fitted on railway vehicles, a cylindrical lateral extension of the tread adapted to bear on the rail and so disposed that the axis of the tire is normally at a certain distance from the axis of the rail, whereby an increased tread surface of the tire is obtained, and the tire can readily adjust itself to variations in the distance between rails.

3. A cover for a pneumatic tire adapted to be run on a rail which comprises a relatively wide cylindrical smooth tread surface, the plane of symmetry of which tread surface is parallel to, and outwardly disposed with respect to, the plane of symmetry of the inner surface of said cover.

4. A pneumatic railway vehicle tire, provided with a rail head engageable tread portion having a surface relatively flat in cross-section whereby said surface is adapted to afford tread-rail head engagement across substantially the full width of a rail head of usual type, and said tread portion being of a width sufficient to maintain substantially full-width engagement as aforesaid throughout normal lateral movements of the tire relative to a rail of usual type.

5. A pneumatic railway vehicle tire, provided with a rail head engageable tread portion having a surface relatively flat in cross-section whereby said surface is adapted to afford tread-rail head engagement across substantially the full width of a rail head of usual type, and said tread portion being of a width sufficient to maintain substantially full-width engagement as aforesaid throughout normal lateral movements of the tire relative to a rail of usual type, and a flange adapted to limit lateral movement of the tire relative to a rail head.

6. A pneumatic railway vehicle tire, provided with a rail head engageable tread portion having a surface relatively flat in cross-section whereby said surface is adapted to afford tread-rail head engagement across substantially the full width of a rail head of usual type, and said tread portion being of a width sufficient to maintain substantially full-width engagement as aforesaid throughout normal lateral movements of the tire relative to a rail of usual type, the median plane of said tread portion being laterally displaced with respect to the median plane of the tire as a whole.

7. In combination, a pneumatic tire for railway vehicle wheels, said tire being provided with a rail-head engageable tread portion having a surface relatively flat in cross-section whereby said surface is adapted to afford tread-rail head engagement across substantially the full width of a rail head of usual type, and said tread portion being of a width sufficient to maintain substantially full-width engagement as aforesaid throughout normal lateral movements of the tire relative to a rail of usual type, and a wheel flange disposed adjacent said tire adapted to limit lateral movement of the tire relative to a rail head.

8. In combination, a rail and a pneumatic tire for railway vehicle wheels contacting therewith, said tire being provided with a rail head engaging tread portion having a surface relatively flat in cross-section whereby said surface affords tread-rail head engagement across substantially the full width of the rail head, said tread portion being of a width sufficient to maintain substantially full-width engagement as aforesaid throughout normal lateral movement of the tire relative to the rail, and a wheel flange engaging said rail to limit lateral movement of the tire relative to the rail head.

9. A cover for a pneumatic tire adapted to be run on a rail which comprises a relatively wide cylindrical smooth tread surface, the plane of symmetry of which tread surface is parallel to, and outwardly disposed with respect to, the plane of symmetry of the inner surface of said cover, and a flange adapted to limit lateral movement of the tire relative to a rail.

Executed this 14th day of April, 1932.

MARCEL JOSEPH JULES MICHELIN,

*Executor of the Estate of André Jules Michelin, Deceased.*